United States Patent
Mehta et al.

(10) Patent No.: US 7,169,719 B2
(45) Date of Patent: Jan. 30, 2007

(54) UNIVERSAL FLEECEBACKED ROOFING MEMBRANE

(75) Inventors: Naresh Mehta, Cranston, RI (US); Jeffrey Charles Flath, Warwick, RI (US)

(73) Assignee: Cooley Incorporated, Pawtucket, RI (US)

( * ) Notice: Subject to any disclaimer, the term of this patent is extended or adjusted under 35 U.S.C. 154(b) by 83 days.

(21) Appl. No.: 10/869,800

(22) Filed: Jun. 16, 2004

(65) Prior Publication Data

US 2005/0282449 A1    Dec. 22, 2005

(51) Int. Cl.
*B32B 27/04* (2006.01)
*B32B 27/12* (2006.01)

(52) U.S. Cl. .............. 442/2; 442/35; 442/36; 442/38; 442/43; 442/44; 442/45; 442/46; 442/49; 442/320

(58) Field of Classification Search .......... 442/2, 442/35, 36, 38, 43, 44, 45, 46, 49, 320
See application file for complete search history.

(56) References Cited

U.S. PATENT DOCUMENTS

| | | | |
|---|---|---|---|
| 3,695,962 A | 10/1972 | Oosterlynck | |
| 4,458,043 A | 7/1984 | Evans et al. | |
| 4,617,219 A * | 10/1986 | Schupack | 428/113 |
| 5,620,554 A | 4/1997 | Venable | |
| 6,544,909 B1 * | 4/2003 | Venkataswamy et al. | 442/38 |
| 6,764,733 B1 * | 7/2004 | Clarke | 428/40.3 |
| 2005/0183365 A1 * | 8/2005 | Naipawer et al. | 52/324 |

* cited by examiner

*Primary Examiner*—Ula C. Ruddock
(74) *Attorney, Agent, or Firm*—Clements Walker; F. Rhett Brockington

(57) ABSTRACT

The invented product is a fleecebacked laminate that is suitable as a single-ply fleecebacked roofing membrane. The laminate consists of the following: 1) a thermoplastic reinforced planar sheet, 2) a needle punched fleece formed on both sides of the thermoplastic reinforced planar sheet, and 3) a thermoplastic polymeric layer extruded onto one side of the fleece. The fleece is formed by needle punching fibers through the reinforced planar sheet. The reinforced planar sheet serves as a common supporting base the resulting two-side fleece. The thermoplastic polymeric layer is embedded with one side of the fleece fibers. The thermoplastic polymeric layer serves as the top layer of the roofing membrane, and the second side of exposed fleece serves as a felt. The thermoplastic polymeric layer is preferably comprised of an extruded PVC substrate, compounded to have excellent weather resistance, printability and to be nonflammable. The fleece fibers are preferably composed of polyester. The thermoplastic reinforced planar sheet is preferably a scrim that is extrusion coated with a thermoplastic substrate that is compounded to have excellent weather resistance, and to be nonflammable.

19 Claims, 1 Drawing Sheet

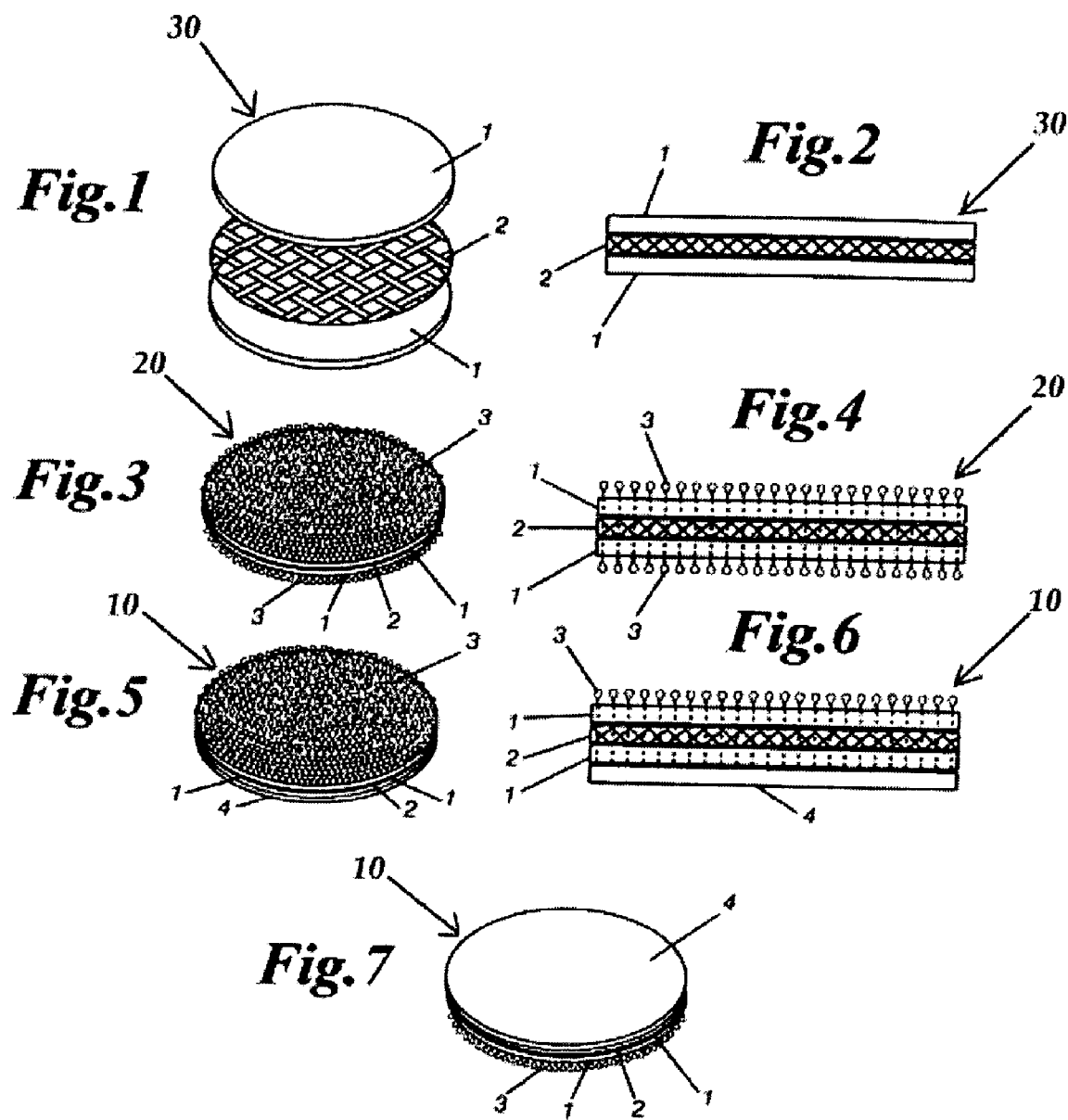

UNIVERSAL FLEECEBACKED ROOFING MEMBRANE

FIELD OF THE INVENTION

The present invention relates generally to a roofing membrane, and more particularly to a roofing membrane having a fleece backing.

BACKGROUND OF THE INVENTION

Roofs having a single-ply roofing membranes are so named to contrast them with another group of commercial roofing products known as built-up roofing. Built-up roofs are literally constructed on the roof by the contractor using component materials such as felts and asphalt. As such, they are subject to the problems caused by weather, worker error, and material inconsistencies. Single-ply membranes, however, are flexible sheets of compounded synthetic materials that are manufactured in a factory to strict quality control requirements that minimize the risks inherent in built-up roof systems. Primary among the many physical and performance properties these materials provide are strength, flexibility, and long-lasting durability. The inherent advantages of pre-fabricated sheets are the consistency of the quality of the products that are manufactured, the versatility in their attachment methods, and therefore, their broader applicability. They are inherently flexible, used in a variety of attachment systems, and compounded for long lasting durability and watertight integrity for years of roof life.

Single-ply roofing membranes can be categorized in technical terms as thermosets, thermoplastics, and modified bitumens. Thermoset membranes are compounded from rubber polymers. The most commonly used polymer is EPDM (often referred to as "rubber roofing"). Another potential thermoset material is neoprene, although this particular formulation is no longer widely used for roofing. Thermoset membranes are successful for use as roofing materials because of their proven ability to withstand the damaging effects of sunlight and most common chemicals generally found on roofs. The easiest way to identify a thermoset membrane is by its seams—it requires the use of adhesive, either liquid or tape, to form a watertight seal at the overlaps. Chlorosulfonated polyethylene (e.g., Hypalon®) is a unique material because it is manufactured as a thermoplastic, but over time, it cures to a thermoset. Hypalon materials are heat sealed by fusing the seams. Thermoplastic membranes are based on elastomeric polymers that can be processed as plastics. The most common thermoplastic is PVC (polyvinyl chloride), which has been made flexible through the inclusion of plasticizers. Thermoplastic membranes are identified by seams that are formed using either heat (i.e., RF welding or hot air) or chemical fusion (using solvent borne cements). The resulting seams are as strong or stronger than the membrane itself. Most thermoplastic membranes are manufactured to include a reinforcement layer, usually polyester or fiberglass, which provides increased strength and dimensional stability. Modified bitumen membranes are interesting hybrids that incorporate the high tech formulation and prefabrication advantages of single-ply with some of the traditional installation techniques used in built-up roofing. These materials are factory-fabricated layers of asphalt, "modified" using a rubber or plastic ingredient for increased flexibility, and combined with reinforcement for added strength and stability. There are two primary modifiers used today: APP (atactic polypropylene) and SBS (styrene butadiene styrene). The type of modifier used may determine the method of sheet installation. Some are mopped down using hot asphalt and some use torches to melt the asphalt so that it flows onto the substrate. The seams are sealed by the same technique.

Historically, roofing membranes were comprised of a scrim impregnated with a bituminous asphaltic or rubber based compound, wherein one side of the membrane was coated with a mineral filler like sand, talc, or fine gravel. The scrim is typically polyester fibers or fiberglass. In the case of polyester fibers they were typically woven and sized, or nonwoven and spun bonded. In the case of fiberglass the glass was usually woven and sized. The fiberglass industry points out that roofing membranes formed from polyester is more prone to burning as polyester will burn and glass will not. The polyester industry points out that fiberglass is inherently more friable, and the membrane will become hard and more subject to cracking. More importantly, glass is hydrophilic and can cause water to weep into the membrane and, therefore, shortens the working life. The coal industry, which supplies the bituminous materials, and the oil industry, which supplies synthetic bitumen, has addressed the flammability issue by including particulate and fibrous fillers, and nonflammable polymers like PVC. U.S. Pat. No. 4,458,043 describes particulate fillers as reinforcing fillers, such as carbon black, silica, zinc oxide, phenolic resin and magnesium carbonate, and non-reinforcing fillers such as calcium carbonate (whiting), barium sulphate, hydrated aluminum silicate, china clay, and magnesium silicate. Fibrous fillers include natural and synthetic fillers, such as mineral fibers, wool, cotton, polyester, nylon, glass, and blends thereof. A more complete list would also include those fillers that also reduce flammability, such as antimony trioxide, and brominated compounds. The most commonly employed rubber is ethylene propylene diene monomer (EPDM), which has excellent weatherability, and can be used with or without a scrim. Common thicknesses are 40 to 200 mils. Splices are often a solid rubber sheet that is spliced together at the job site, and applied using either an asphalt based adhesive, or a polyurethane. The EPDM is often formulated so that it will continue to vulcanize when exposed to direct sunlight. A problem with a continuous curing system is that there will be shrinkage as curing continues, however, and as the EPDM cures it becomes more difficult to splice, because it is difficult to adhere to, except at high temperatures.

To solve the adhesion problem with vulcanized EDPM rubber, roofing membranes commonly have a backing laminated to the EPDM. This backing is commonly referred to as a fleece in the roofing industry. The fleece creates a surface that is easily adhered, and also adds dimensional strength. Fleece, in this context, is substantially a fuzzy scrim, felt or non-woven. The Carlisle Corporation manufactures a fleecebacked EDPM. The product and method of manufacture is described in U.S. Pat. No. 5,620,554. In a continuous process, a first side of roll stock of EPDM is abraded, passed through a rinsing vat filled with water and/or other cleaning fluids, and between a pair of counter-rotating cylinders covered with stiff-bristled nylon brushes that effectively remove any talc or other non-stick coatings from the vulcanized sheet, heated to a range of 250 to 350° F., and laminated to a polyester fleece matting with an intervening filmic polymeric adhesive forming a composite material. During lamination the polymeric film is melted, thus causing the matting to adhere to the first side of the cleaned, heated rubber stock. Typically, a selvage width on either side of the fleece is primed, and then laminated to a double-coated pressure sensitive tape having a release liner. The double-coated tape is to be used as a means for making a butt-splice with an adjoining roofing membrane. A problem with a splice using a double-coated tape is that there will frequently be adjoining membranes that do no have a selvage width that can be co-joined, and tape will either have to adhere to the un-abraded side of the EPDM roofing membrane, or some fastening system, such as one that adheres to the fleece and the un-abraded side of the EPDM roofing membrane, will need to be employed. In any case, the properties that contribute to the good weather resistance of EPDM rubber make splicing difficult. RF welding or solvent etching, for instance, as is used to join thermoplastic materials is problematic because cement solvents tend not to dissolve, but just to swell the EPDM rubber. Most EPDM membrane rubber is not thermoplastic, and does not facilely flow when heated, and has a low surface energy making EPDM rubber difficult to adhere to.

In an unrelated industry, Lin-Luc Jacques Servais Oosterlynck, disclosed in U.S. Pat. No. 3,695,962 a prior art Method of Making Pile Fabrics, wherein a fibrous layer is needle punched through a support fabric, whereby the needle punched fibers form tufts extending from the support fabric. The fibre tufts are then fixed in a position substantially normal to the support fabric, which is then stripped away from the fibrous layer. The fixing of the fibre tufts may be accomplished by a heat treatment or by a suitable chemical treatment. The resulting pile fabric is typically a carpet, or a velour. Of interest is that by backside needling, U.S. Pat. No. 3,695,962 discloses a process where the height of the pile can be tightly controlled.

What is desired is a single-ply roofing that is easily seamed at the job site that has excellent weather resistance, and that has excellent adhesion to roofing cements.

SUMMARY OF THE INVENTION

The invention is a product and a method for producing a fleecebacked laminate comprised of a thermoplastic reinforced planar sheet having a two-sided needle punched fleece, wherein a first side of the fleece is also embedded in a thermoplastic polymeric layer, and on the opposing side of the thermoplastic reinforced planar sheet, a second side of fleece forms a felt. The fleecebacked laminate is particularly suitable as a roofing membrane, and can be universally applied where roofing membranes are currently used.

The thermoplastic reinforced planar sheet is preferably comprised of a scrim or nonwoven coated fabric coated with a thermoplastic substrate, having good weather resistance. Exemplary of the thermoplastic substrate are thermoplastic polymers selected from the group consisting of ethylene-propylene-diene-monomer (EPDM), compounded PVC, elastomeric acrylic polymers, PVF (polyvinyl fluoride), elastomeric polyurethanes, chlorinated rubbers, elastomeric polyesters, modified bitumens, elastomeric polycarbonates, polyimides, polyamides, chlorosulfonated polyethylene, styrenated aliphatic block copolymers (e.g., Kraton® SEBS), modified elastomeric polyolefins, nitrile butyl rubber, silicone rubber, and blends thereof. A preferred thermoplastic substrate is a compounded PVC substrate. The PVC substrate is compounded to have excellent weather resistance and to be nonflammable. The PVC substrate can be applied as an emulsion, a sol, or extruded. An extruded compounded PVC substrate has processing characteristics that enable a substantial coating to be applied at relatively high manufacturing line speeds, and thereby lowering costs. The extruded PVC substrate has good thermal properties, good processability, good uniformity, and fungicidal and mold resistance. The preferred PVC resin is plasticized, for instance with a permanent plasticizer. Alkyl phthalates, and particularly diisodecyl phthalate (DIDP), epoxidized soybean oil, and ESO are commonly employed.

The thermoplastic substrate can contain a filler, such as clay, silicate, talc, and calcium carbonate. A preferred filler is calcium carbonate. A colorant can be added to the composition in the form of a color concentrate comprising an opacifier, a whitener, and a blue toner. Generally, the color concentrate is comprised substantially of titanium dioxide ($TiO_2$), blue toners, and optical brighteners. Color concentrates, in the form masterbatches, stabilizers and additives to prevent degradation and augment compounding. Titanium dioxide imparts UV stability, as well as opacity and whiteness. Applicant recognizes that other pigments, such as barium oxide, and other whitening pigments can be used in combination with titanium dioxide or in substitution thereof. A preferred optical brightener is Uvitex® OB (2,5-thiophenedyl-bis(5-tert-butyl-1,3-benzoxazole) made by Ciba Specialty Chemicals. The composition also contains a flame retardant. Examples of suitable flame-retardants include antimony trioxide and brominated compounds. The preferred flame retardant is antimony trioxide. The thermoplastic polymer, plasticizer, filler, color concentrate, and flame retardant account for about 95% of the composition of the formula. Other useful additives are fungicides and biocides.

The scrim or nonwoven fabric is formed from yarns selected from the group consisting of: polyesters, nylons, polypropylenes, polyamides, polyimides, polyethylenes, cellulosic materials, glasses, polyacrylics, polycarbonates, polyacetals and ketals, polyurethanes, copolymers, terpolymers, and blends thereof.

Typically, the thermoplastic reinforced planar sheet has a coating of the thermoplastic substrate coated onto a fist side of polyester scrim, and a second coating of the thermoplastic substrate coated onto the back side of the scrim fabric.

As previously stated, the thermoplastic reinforced planar sheet is needle punched forming a two-sided fleece. The fleece can be formed simultaneously on both sides of the thermoplastic reinforced planar sheet by needling a fibrous mat through the thermoplastic reinforced planar sheet, wherein fibers from the fibrous mat are needle punched through the planar sheet and to the opposing side. The needling process converts the thermoplastic reinforced planar sheet into a two-sided needle punched fleece, where the fibers project through the thermoplastic reinforced planar sheet. The first side of fleece and the second side of fleece are on opposing sides of the thermoplastic reinforced planar sheet. The thermoplastic reinforced planar sheet serves as a common supporting base for both sides of the fleece. The height of the pile is determined by the stroke length of the needling, less the thickness of the supporting base. An exemplary nominal range for the height of the pile is 0.4 mm to 5.0 mm. The nominal range of the base is 0.2 mm to 3.0 mm. The composition of the fleece is selected from the group consisting of: polyesters, nylons, polypropylenes, polyamides, polyimides, polyethylenes, cellulosic materials, glasses, polyacrylics, polycarbonates, polyacetals and ketals, polyurethanes, copolymers and terpolymers, and blends thereof. Polyester is particularly suitable as a fleece fiber for its combination of properties, including weather resistance, strength, availability and cost.

The fibers on one side of the fleece become embedded in the thermoplastic polymeric layer when the thermoplastic polymeric layer is coated onto the first side of fleece. The thermoplastic polymeric layer in is selected from thermoplastic materials having good weather resistance, water resistance, mold resistance, and overall good outdoor weathering properties. The thermoplastic material is select from the group of thermoplastic polymers consisting of: ethylene-propylene-diene-monomer (EPDM), compounded PVC, elastomeric acrylic polymers, PVF (polyvinyl fluoride), elastomeric polyurethanes, chlorinated rubbers, elastomeric polyesters, modified bitumens, elastomeric polycarbonates, polyimides, polyamides, chlorosulfonated polyethylene, styrenated aliphatic block copolymers (e.g., Kraton® SEBS), modified elastomeric polyolefins, nitrile butyl rubber, silicone rubber, and blends thereof.

An additional desired criterion is that the thermoplastic polymeric layer also have good printability. Printability enables the creation of a roof membrane having various colors and designs. For instance, the disclosed invention can be coated or printed to have a helicopter target landing area, or colored to imitate a copper roof. The thermoplastic material is preferably applied as an extrudate onto one side of the fleece, such that the fleece fibers are intricately embedded in the thermoplastic polymeric layer. The process conditions can be adjusted to control the level of embedding.

The disclosed universal fleecebacked roofing membrane preferably typically has a temperature performance range, from a low of about −65° F. (−54° C.) to a high of about 200° F. (93.33° C.). The flame listing via the California State Fire Marshall NFPA 701 is projected to be E8U Type 1. The flame resistance is projected to have an after-flame time of 2 sec. maximum, and a length of char 10 in.(25.4 cm) maximum.

The fleecebacked roofing membrane is applied using conventional roofing methods. The fleece side of the membrane is adhered to the roof using appropriate roofing adhesives, which are typically moisture curing urethanes, or asphaltic adhesives. The fleece fibers become embedded in the roofing adhesive. Alternatively, the fleecebacked roofing membrane can be secured using mechanical fasteners and, or a combination of adhesives and mechanical fasteners. The fleecebacked membrane can be spliced at the job site or in the plant using RF welding or PVC cements, as well as those others well known to those in the roofing industry. Examples include a butt splice, wherein a thermoplastic reinforced planar strip overlaps the seam formed by the adjoining membranes, a tab splice, wherein a selvage portion of the thermoplastic polymeric layer bonded to one side of the fleece overlaps an adjoining roofing membrane, and where permitting, an overlap splice, wherein adjoining membranes are lapped, glued, and stitched.

A method for forming the fleecebacked roofing membrane comprises the following steps. A polyester scrim is extrusion coated with a first thermoplastic substrate forming a first pass intermediate product. The first pass intermediate product is then coated with a second coating of an extruded thermoplastic substrate, therein forming a thermoplastic reinforced planar sheet. The thermoplastic reinforced planar sheet is then needle punched, which pushes fibers through the sheet forming a first side of fleece and forming a second side of fleece on the opposing side of the thermoplastic reinforced planar sheet. The thermoplastic reinforced planar sheet serves as a common supporting base for the fleece. The first side of the exposed fleece is then coated with an extruded thermoplastic material, therein forming the top side of the fleecebacked roofing membrane. The fibers are preferably comprised of polyester, and are needle punched using a mat of polyester fibers.

The thermoplastic material forms the top, exposed layer of the roofing membrane, and the thickness and composition of the thermoplastic material are selected to optimize this function. The fleecebacked roofing membrane is formed as rolls, which can then be slit or spliced, depending on the size requirements and the availability of fleecebacked laminate material. The fleecebacked membrane can be printed or coated pursuant to the job specifications. The width of the thermoplastic polymeric layer can be formed to exceed the width of the fleece, thereby creating a selvage on either side of the fleecebacked roofing membrane. The selvage is suitable for forming a splice between adjacent roofing membranes. Alternatively, the needle punching can be in strips, therein also creating a selvage on either side.

OBJECTS OF THE INVENTION

The principal object of the present invention is to provide a fleecebacked laminate that is suitable as a roofing membrane having a fleece backing.

Another object is to provide a roofing membrane that can be easily spliced using conventional PVC cements and thermal fusing techniques, such as RF welding.

Another object is to provide a roofing membrane, wherein the fibers of the fleece are embedded in the extruded membrane, thereby forming a structural bond.

Another object of this invention is to provide a method of manufacturing a fleecebacked laminate that is a roofing membrane.

A further object of this invention is to provide a method of manufacturing multiple narrow splicing widths of a fleecebacked laminate, where following slitting, said splicing widths can be used to form butt splices for the disclosed roofing membrane.

A further object of this invention is to provide a method for adhering the roofing membrane to a roof using mechanical fastening devices and adhesives.

BRIEF DESCRIPTION OF THE DRAWINGS

The foregoing and other objects will become more readily apparent by referring to the following detailed description and the appended drawings in which:

FIG. 1 is an exploded view of a thermoplastic reinforced planar sheet.

FIG. 2 is a cross-sectional view of a thermoplastic reinforced planar sheet.

FIG. 3 is a perspective view of a thermoplastic reinforced planar sheet that has fibers needle punched there through, forming a two-sided fleece.

FIG. 4 is a cross-sectional view of the two-sided fleece having a common supporting base as shown in FIG. 3.

FIG. 5 is a perspective view of the invention, a fleecebacked roofing membrane, as seen from the fleece side.

FIG. 6 is a cross-sectional view of the invention as illustrated in FIG. 5.

FIG. 7 is a perspective view of the invention, a fleecebacked roofing membrane, as seen from the top side of the thermoplastic polymeric layer.

DETAILED DESCRIPTION

The invented product is a fleecebacked laminate that is suitable as a fleecebacked roofing membrane. The laminate is comprised of the following: 1) a thermoplastic reinforced planar sheet, 2) a needle punched fleece formed on both sides of the thermoplastic reinforced planar sheet, and 3) a thermoplastic polymeric layer extruded onto one side of the fleece. The fleece is formed by needle punching fibers through the reinforced planar sheet. The reinforced planar sheet serves as a common supporting base for the resulting two-side fleece. The thermoplastic polymeric layer is embedded with one side of the fleece fibers. The thermoplastic polymeric layer serves as the top layer of the roofing membrane, and the second side of fleece fibers serves as a felt. The thermoplastic polymeric layer is preferably composed of an extruded PVC substrate, compounded to have excellent weather resistance, printability, and to be nonflammable. The fleece fibers are preferably composed of polyester. The thermoplastic reinforced planar sheet is preferably a scrim extrusion coated with a PVC resin that is compounded to have excellent weather resistance, and to be nonflammable.

Referring to FIG. 1 and FIG. 2, the thermoplastic reinforced planar sheet 30 is a polyester scrim 2 having a (7 to 24)×(7 to 24) count of 50 to 2000 denier threads. The preferred scrim has a (9)×(9) count of 1000 denier threads. On a first side of the scrim is extrusion coated with 4–10 mils of the compounded PVC substrate 1 in forming a first pass. In a second pass, an additional 4–10 mils of compounded PVC substrate 1 is coated onto the opposite side. The composition of the compounded PVC substrate is, by weight percent, from about 46% to about 53% PVC, from about 17% to about 24% plasticizer, and the balance is filler, colorants, flame retardants, stabilizers, and lubrication processing aides.

Referring to FIG. 3 and FIG. 4, the thermoplastic reinforced planar sheet 30 is needle punched with polyester fibers 3, therein creating a two-sided fleece 20. The thermoplastic reinforced planar sheet 30 serves as a common support base for the fleece.

Referring to FIG. 5 and FIG. 6, the two-sided fleece 20 is coated with a thermoplastic polymeric layer. In one embodiment, the thermoplastic polymeric layer is comprised of a thermoplastic material that is a compounded PVC substrate 4. The resulting product is a fleecebacked laminate 10 that is suitable as a universal fleecebacked roofing membrane. As shown in FIG. 5 and FIG. 6, the thermoplastic polymeric layer 4 is formed as an extruded coating onto one side of the fleece 20. The opposing side of the fleecebacked laminate 10 is shown in FIG. 7.

When forming the thermoplastic reinforced planar sheet, it is desired that the sheet be fully annealed to relieve stress, as required. The thermoplastic substrate and scrim are nip squeezed between a rubber roll and steel roll to promote adhesion of the thermoplastic substrate to the scrim. The scrim is preheated prior to coating with to thermoplastic substrate. The thermoplastic substrate is extruded from the die onto the scrim at the nip point of a steel roll and a rubber roll. The thermoplastic substrate is on the steel roll side. The nip forces the thermoplastic substrate against the scrim on one side, and the steel roll cools and smoothes the thermoplastic substrate. The process for making the thermoplastic reinforced planar sheet is usually run in two (2) passes, however, it is possible to form the thermoplastic reinforced planar sheet in one pass by applying both the face and the back material to the fabric at the same time or by laminating a film to the scrim using an extruded adhesive.

Furthermore, it is recognized that there may be many sources for a suitable thermoplastic reinforced planar sheet, and that while a method has been given for its production, that the disclosed product and method does not turn on the exclusive utilization of any particular thermoplastic reinforced planar sheet.

The composition of the thermoplastic material is weather resistant, mold and fungi resistant, flame resistant (NFPA 701 vertical burn), and will pass the requirements of the CSFM (California State Fire Marshall).

Table 3 lists typical specifications for the fleecebacked roofing membrane using the composition and the process as described in the detailed description. The fleecebacked roofing membrane has a wide functional temperature range. Extending from a low temperature is −65° F. (−55° C.) to a high of about 200° F. (93° C.). The tear strength in the warp direction is 70 lbs (31.1 daN and in the fill direction 55 lbs (24.4 daN). The puncture resistance via Screwdriver is 35 lbs (15.6 daN) and via ball is 275 lbs (122.2 daN). There was no loss in biocidal resistance, as evidence that there is no fungus growth (ASTM G21-21-90).

TABLE 3

Base Fabric:

Weight: 12 ± 0.5 oz/yd 2/406.8 ± 16.95 g\m 2
Gauge: 0.013 ± 0.0010 in./0.033 ± 0.003 cm.
Type of coating: PVC
Physical Specifications:

Tensile Strength:
Grab Warp: 210 Lbs./93 daN
Fill: 175 Lbs./78 daN
Tear Strength:

Butterfly Warp: 70 Lbs./31.1 daN
Fill: 55 Lbs./24.4 daN
Temperature:

Low Temp: −65° F./−54° C.
High Temp: 180/200° F./82/93.33° C.
Flame Resistance:

Time of Afterflame: 2 sec. max./2 sec max.
Length of Char: 10 in. max./25.4 cm max.
Flame Listing:
California State Fire Marshall NFPA 701, E8U Type 1
Other Properties:

Seam Strength: 100 × 100 Lbs./in./89X89 daN/5 cm
Opacity: 90%
High Gloss: 40–50 @ 60%
Fungus Resistance: No Growth (ASTM G21-21-90)
Puncture:

Screwdriver: 35 Lbs/15.6 daN
Ball: 275 Lbs./122.2 daN

The fleecebacked roofing membrane product is sold to installers who will lay the membrane on a roof, and fuse one piece to the other by overlapping, and heat sealing the fleece-free edge portion of the membrane. The roofing membrane can either be mechanically attached or fully adhered to the roof deck.

SUMMARY OF THE ACHIEVEMENT OF THE OBJECTS OF THE INVENTION

From the foregoing, it is readily apparent that I have invented a fleecebacked laminate that is suitable as a single-ply universal fleecebacked roofing membrane, a method of making the same, and for making seaming membranes having a width with a selvage edge for splicing and installing the product on a roof. The fleecebacked roofing membrane made by the invented method can be mechanically attached, as well as fully adhered to a roof deck, without the installation problems associated with cured EPDM rubber based roofing membranes. It is further apparent that the disclosed invention has a bond between the fleece and the top layer of the membrane that is structurally superior to an adhesive bond, as is nominally formed between the membrane and the fleece, because in the instant invention the fibers are intermeshed in the thermoplastic polymeric layer.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A fleecebacked laminate comprising:
   a thermoplastic reinforced planar sheet;
   a two-sided needle punched fleece comprised of fibers that project through the reinforced planar sheet forming a first side of exposed fleece and forming a second side of exposed fleece on the opposing side of the reinforced planar sheet; and
   a thermoplastic polymeric layer bonded to the first side of the two-sided needle punched fleece.

2. The fleecebacked laminate, as claimed in claim 1, wherein the fleecebacked laminate is a fleecebacked roofing membrane.

3. The fleecebacked laminate, as claimed in claim 1, wherein the thermoplastic polymeric layer is embedded with the fibers, and wherein said thermoplastic polymeric layer is comprised of materials that have excellent outdoor weather resistance.

4. The fleecebacked laminate, as claimed in claim 3, wherein the thermoplastic polymeric layer is comprised of a thermoplastic material.

5. The fleecebacked laminate, as claimed in claim 4, wherein the thermoplastic material is selected from the group consisting of ethylene-propylene-diene-monomer, compounded PVC, elastomeric acrylic polymers, PVF (polyvinyl fluoride), elastomeric polyurethanes, chlorinated rubbers, elastomeric polyesters, modified bitumens, elastomeric polycarbonates, polyimides, polyamides, chiorosulfonated polyethylene, styrenated aliphatic block copolymers, modified elastomeric polyolefins, nitrile butyl rubber, silicone rubber, and blends thereof.

6. The fleecebacked laminate, as claimed in claim 5, wherein the compounded PVC is a composition that comprises a porous PVC resin.

7. The fleecebacked laminate, as claimed in claim 6, wherein the composition further comprises a plasticizer, a filler, titanium dioxide, a flame-retardant, an antimicrobial, rheological processing aides, lubrication processing aids that are generally of the internal lubricant type, a thermal stabilizer, a UV stabilizer, and a free radical stabilizer.

8. The fleecebacked laminate, as claimed in claim 4, wherein the thermoplastic substrate is selected from the group consisting of ethylene-propylene-diene-monomer, compounded PVC, elastomeric acrylic polymers, PVF (polyvinylfluoride), elastomeric polyurethanes, chlorinated rubbers, elastomeric polyesters, modified bitumens, elastomeric polycarbonates, polyimides, polyamides, chlorosulfonated polyethylene, styrenated aliphatic block copolymers, modified elastomeric polyolefins, nitrile butyl rubber, silicone rubber, and blends thereof.

9. The fleecebacked laminate, as claimed in claim 8, wherein the compounded PVC applied as an extrudate.

10. The fleecebacked laminate, as claimed in claim 9, wherein the compounded PVC substrate is a composition that comprises a porous PVC resin.

11. The fleecebacked laminate, as claimed in claim 10, wherein the composition further comprises a plasticizer, a filler, titanium dioxide, a flame-retardant, an antimicrobial, rheological processing aides, lubrication processing aids that are generally of the internal lubricant type, a thermal stabilizer, a UV stabilizer, and a free radical stabilizer.

12. The fleecebacked laminate, as claimed in claim 8, wherein thermoplastic reinforced planar sheet is annealed.

13. The fleecebacked laminate, as claimed in claim 1, wherein thermoplastic reinforced planar sheet is comprised of a scrim and a thermoplastic substrate.

14. The fleecebacked laminate, as claimed in claim 13, wherein said scrim is comprised of woven polyester fiber.

15. The fleecebacked laminate, as claimed in claim 13, wherein the thermoplastic substrate is comprised of materials that have excellent outdoor weather resistance.

16. The fleecebacked laminate, as claimed in claim 8, wherein thermoplastic reinforced planar sheet is coated with a second extruded coating of a thermoplastic substrate.

17. The fleecebacked laminate, as claimed in claim 16, wherein thermoplastic reinforced planar sheet is annealed.

18. The fleecebacked laminate, as claimed in claim 1, wherein the fibers are needle punched from a mat, pushed through the reinforced planar sheet, thereby forming the two-sided needle punched fleece sharing a common supporting base.

19. The fleecebacked laminate, as claimed in claim 18, wherein the fibers are comprised of polyester.

* * * * *